UNITED STATES PATENT OFFICE 2,613,210

METHYLENE-BIS-2-IMIDAZOLIDONES

Melvin D. Hurwitz, Philadelphia, and Robert W. Auten, Jenkintown, Pa., assignors to Rohm & Haas Company, Philadelphia, Pa., a corporation of Delaware No Drawing. Application September 13, 1950, Serial No. 184,724

6 Claims. (Cl. 260—309.7)

This invention relates to methylene-bis-2-imidazolidone) and methylene-bis(4-methyl-2-imidazolidone) and to a process for the preparation of these methylene-bis-2-imidazolidones.

Formation of mono- and poly-methylol derivatives of carbamides is well known. They result from the reaction of formaldehyde and a carbamide having hydrogen available for reaction on the nitrogen atoms thereof. The conventional reaction of 2-imidazolidone, for example, with formaldehyde leads to monomethylol or dimethylol derivatives, thus

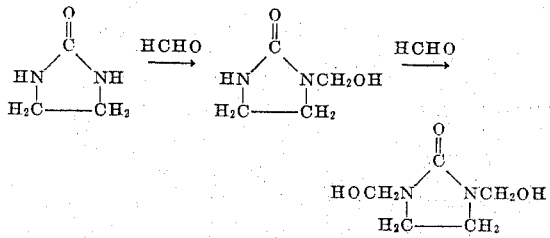

It is now found that when there are reacted about two moles of a 2-imidazolidone with one mole of formaldehyde in two stages, the first under neutral or alkaline conditions and the second under acidic conditions, there results a methylene-bis-2-imidazolidone. This is a valuable new type of compound which reacts with formaldehyde to give N,N'-dimethylol derivatives, which have a special utility as reactants for cellulose. Cellulose which has been reacted therewith becomes less hydrophilic, gains in crush-resistance, and is changed in its affinity for dyes. While other methylol-carbamide condensates are known to alter the properties of cellulose, the methylol derivatives of the compounds of this invention give cellulose products which are more resistant to chlorine and more abrasion-resistant than previously known products. The reaction with cellulose is particularly valuable in connection with processes in which treated cellulose products are given mechanical finishes such as glazing, schreinering, moiréing, embossing, etc. Patterned or finishing effects which are imparted to cellulose fabrics impregnated with the methylol condensates while the fabrics are in a plastic state as from the presence of moisture become permanent when the treated cellulose is heated, particularly when an acidic catalyst is present.

As a 2-imidazolidone, there may be used ethyleneurea or propyleneurea,

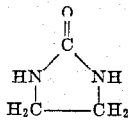

or

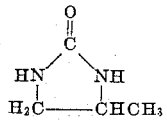

One of these cyclic compounds or a mixture thereof is reacted with formaldehyde, usually in aqueous solution. The compound may be mixed with formaldehyde in a 2:1 mole ratio or one mole of a said compound may be reacted with one mole of formaldehyde under neutral to alkaline conditions and a second mole of a said compound added to the reaction mixture.

The formaldehyde is generally used in the form of an aqueous solution. It may, however, be supplied from one of its revertible polymers.

The primary reaction mixture is heated at 50° C. to 100° C. until the methylol reaction is complete. The pH of the reaction mixture from two moles of cyclic compound to one mole of formaldehyde is then carried to the acidic side and the reaction mixture is heated at about 75° C. to about 110° C. Water can be driven off to yield a solid product, which in the case of methylene-bis-2-imidazolidone may be recrystallized, if desired, from a solvent such as an alcohol.

This process is illustrated in detail in the following examples.

Example 1

There are mixed 516 parts by weight of 2-imidazolidone and 246 parts of a 36.5% solution of formaldehyde. The mixture is stirred and heated to 72° C. until a clear solution results. There is then added a 50% solution of formic acid until the pH of the reaction mixture is 5. The acidified mixture is heated under reflux (about 108°–109° C.) for an hour. The water is distilled off under low pressure to yield a solid. This is recrystallized from methanol. The yield is 227 parts of a compound corresponding in composition to N,N'-methylene-bis-2-imidazolidone. It melts at 181°–185° C. This product has a molecular weight of 182 (theory 184) and contains 29.6% of nitrogen (theory 30.4%).

It is reacted with formaldehyde as follows. Formaldehyde, adjusted to a pH of 9.2, is mixed with the product in a 2:1 mole ratio. The mixture is heated at about 75° C. and stirred for a half-hour. The reaction mixture is neutralized with carbon dioxide and cooled. A crystalline product is formed and is filtered off. It is recrystallized from methanol.

From a reaction mixture of 30 parts by weight of methylene-bis-2-imidazolidone and 26 parts of 36.5% formaldehyde there are thus obtained 22 parts of recrystallized 3,3'-dimethylol-1,1'-methylene-bis-2-imidazolidone. This product melts at 162°–163.5° C.

Example 2

There are mixed 100 parts of 4-methyl-2-imidazolidone and 41 parts of a neutral 36% aqueous formaldehyde solution. The mixture is stirred and heated at about 50° C. until a homogeneous solution results, is adjusted to pH 8.5, and is then heated for ten minutes on a steam bath. The solution is then treated with formic acid until it has a pH of 4.5 and is heated under reflux for an hour. The water is then evaporated under reduced pressure to leave a residue which is heated to 125° C. to give a glassy solid. This corresponds in composition to

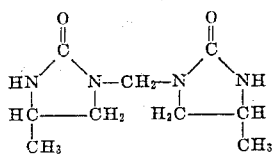

The product has a molecular weight of 210 and contains 25.7% of nitrogen (theory 26.4%). It reacts with formaldehyde to give a dimethylol derivative. This derivative reacts with cellulose and alters the properties thereof. Cellulose treated with a 0.5% to 40% solution of this product gains in crush-resistance. The cellulose treated with a solution of this product can be embossed or glazed and then cured with excellent results. Use in the treating solution of 0.1% to 5% of an acidic catalyst such as ammonium phosphate, ammonium thiocyanate, oxalic acid, tartaric acid, or the like greatly accelerates the rate of reaction between cellulose and compound.

Example 3

There are mixed 86 parts of 2-imidazolidone and 85 parts of a 35.2% formaldehyde solution which has been adjusted with a sodium carbonate solution to a pH of 8. The mixture is stirred and heated at 60° C. for several hours. To this mixture is added 4-methyl-2-imidazolidone in an amount of 100 parts by weight and the mixture is heated until it becomes homogeneous. It is then rendered acidic by the addition of a little dilute hydrochloric acid. The acidified mixture is heated at 103°–110° C. for an hour and then evaporated under reduced pressure to yield a glassy solid. This product corresponds in composition to

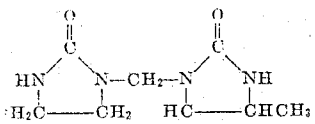

It behaves in the same fashion as described for the products above.

The products of this invention may be represented by the formula

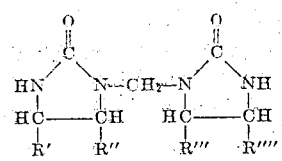

wherein $R'$, $R''$, $R'''$, and $R''''$ represent hydrogen or the methyl group with the proviso that at least one of these is hydrogen in each of the pairs $R'$—$R''$ and $R'''$—$R''''$.

By the procedure described above there may be reacted ethylene thiourea or propylene thiourea and formaldehyde to give sulfur-containing analogues. These have utilities similar to those of the methylene-bis-2-imidazolidones. The linkages of the methylene group may involve, however, not only nitrogen atoms but also one or both sulfur atoms.

Formation of methylol derivatives of the methylene-bis-2-imidazolidones has been mentioned above. These derivatives react with alcohols under the influence of an acidic catalyst to form ethers. Methyl alcohol, for example, yields the N,N'-dimethoxymethyl derivatives. These, as other alkoxymethyl derivatives, are useful reactants with cellulose, modifying the properties thereof as has been described for the methylol derivatives. The alkoxymethyl derivatives may be mixed with urea-formaldehyde or melamine-formaldehyde to act as plasticizers and softeners, particularly when longer chained alcohols are used to form the alkoxymethyl derivatives. A comparable use of these is as modifiers for alkyd resin coatings.

We claim:

1. As new chemical substances, compounds of the formula

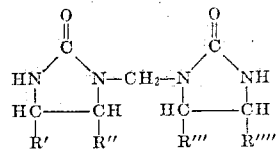

wherein $R'$, $R''$, $R'''$, and $R''''$ represent members of the class consisting of hydrogen and the methyl group with the proviso that at least one of the pair $R'$ and $R''$ and of $R'''$ and $R''''$ is hydrogen.

2. As a new chemical compound, N,N'-methylene-bis-2-imidazolidone.

3. As a new chemical compound, N,N'-methylene-bis(4-methyl-2-imidazolidone).

4. A process of preparing a compound of the formula

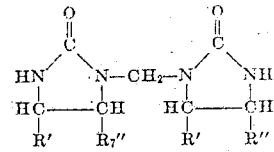

wherein $R'$ and $R''$ represent members of the class consisting of hydrogen and the methyl group with the proviso that at least one member of each pair of $R'$ and $R''$ is hydrogen, which comprises reacting under neutral to alkaline conditions a mole of formaldehyde and a mole of a 2-imidazolidone of the formula

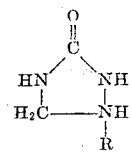

where R is a member of the class consisting of hydrogen and the methyl group, whereby a monomethylol 2-imidazolidone is formed, and reacting under acidic conditions said monomethylol 2-imidazolidone with the said 2-imidazolidone.

5. A process for preparing N,N'-methylene-bis-2-imidazolidone which comprises reacting under neutral to alkaline conditions one mole of 2-imidazolidone and one mole of formaldehyde, whereby monomethylol 2-imidazolidone is formed, and reacting under acidic conditions said monomethylol 2-imidazolidone and 2-imidazolidone.

6. A process for preparing N,N'-methylene-bis-(4-methyl-2-imidazolidone) which comprises reacting under neutral to alkaline conditions one mole of 4-methyl-2-imidazolidone and one mole of formaldehyde, whereby monomethylol 4-methyl-2-imidazolidone is formed, and reacting under acidic conditions said monomethylol 4-methylol 2-imidazolidone with the said 2-imidazolidone.

MELVIN D. HURWITZ.
ROBERT W. AUTEN.

REFERENCES CITED

The following references are of record in the file of this patent:

UNITED STATES PATENTS

| Number | Name | Date |
|---|---|---|
| 2,373,136 | Hoover et al. | Apr. 10, 1945 |
| 2,517,750 | Wilson | Aug. 8, 1950 |